(12) United States Patent
Liu et al.

(10) Patent No.: US 10,348,454 B2
(45) Date of Patent: *Jul. 9, 2019

(54) ERROR RESILIENCE FOR INTERACTIVE REAL-TIME MULTIMEDIA APPLICATION

(71) Applicant: Zoom Video Communications, Inc., Santa Clara, CA (US)

(72) Inventors: Qiyong Liu, Hangzhou (CN); Zhaofeng Jia, Hefei (CN); Kai Jin, Hangzhou (CN); Jing Wu, Hangzhou (CN); Huipin Zhang, Palo Alto, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/727,907

(22) Filed: Oct. 9, 2017

(65) Prior Publication Data
US 2018/0034594 A1   Feb. 1, 2018

Related U.S. Application Data

(63) Continuation of application No. 15/157,182, filed on May 17, 2016, now Pat. No. 9,813,193, which is a
(Continued)

(51) Int. Cl.
*H04L 1/18* (2006.01)
*H04L 1/08* (2006.01)
(Continued)

(52) U.S. Cl.
CPC .............. *H04L 1/08* (2013.01); *H04L 1/0009* (2013.01); *H04L 1/0045* (2013.01);
(Continued)

(58) Field of Classification Search
CPC ....... H04L 1/08; H04L 1/1851; H04L 1/0045; H04L 1/0076; H04L 43/0829;
(Continued)

(56) References Cited

U.S. PATENT DOCUMENTS 5,928,330 A * 7/1999 Goetz .................. H04N 19/587
                                                   348/E5.008
6,275,471 B1 * 8/2001 Bushmitch ............ H04L 1/1851
                                                   348/E7.071
(Continued)

*Primary Examiner* — Christine T. Tu
(74) *Attorney, Agent, or Firm* — James M. Wu; JW Law Group

(57) ABSTRACT

An error resilience method comprising: using a computer, creating and storing, in computer memory, one or more FEC filter tables for use by the FEC filter for selectively forwarding a FEC packet; selectively forwarding a request for the FEC packet through a FEC filter based on the FEC table and a dynamic packet loss level at a receiver; limiting a re-transmission request for a particular packet through the FEC filter based on a number of re-transmission requests for the particular packet; and selectively skipping a key frame request based on a number of key frame requests received from a plurality receiver devices, wherein the method is performed by one or more special-purpose computing devices.

14 Claims, 9 Drawing Sheets

Related U.S. Application Data continuation of application No. 14/462,266, filed on Aug. 18, 2014, now Pat. No. 9,344,218.

(60) Provisional application No. 61/867,558, filed on Aug. 19, 2013.

(51) Int. Cl.
*H04L 1/00* (2006.01)
*H04N 7/15* (2006.01)
*H04L 29/06* (2006.01)
*H04L 12/26* (2006.01)

(52) U.S. Cl.
CPC .......... *H04L 1/0076* (2013.01); *H04L 1/1867* (2013.01); *H04L 43/0829* (2013.01); *H04L 65/403* (2013.01); *H04L 65/607* (2013.01); *H04L 65/80* (2013.01); *H04N 7/152* (2013.01); *H04L 1/007* (2013.01); *H04L 2001/0093* (2013.01)

(58) Field of Classification Search
CPC ..... H04L 1/0009; H04L 1/007; H04L 1/1867; H04L 65/403; H04L 65/607; H04L 65/80; H04L 2001/0093; H04N 19/587; H04N 21/222; H04N 7/15; H04N 7/152
USPC .......... 714/751, 746, 748, 75; 370/242, 282, 370/290, 291
See application file for complete search history.

(56) References Cited

U.S. PATENT DOCUMENTS

| 7,406,497 B1* | 7/2008 | Markowitz | H04N 21/222 375/E7.013 |
| 2004/0095950 A1* | 5/2004 | Shirogane | H04L 1/0009 370/428 |
| 2006/0048036 A1* | 3/2006 | Miura | H03M 13/03 714/758 |

\* cited by examiner

| Loss Level | Loss | Anchor loss for computation |
|---|---|---|
| 0 | 0%, 1% | 1% |
| 1 | 1%, 3% | 2% |
| 2 | 3%, 7%, | 5% |
| 3 | 7%, 15% | 10% |
| 4 | 15%, 25% | 20% |
| 5 | 25%, 100% | 30% |

Figure 3

| N | 0 | 1 | 2 | 3 | 4 | 5 |
|---|---|---|---|---|---|---|
| 1 | 0 | 1 | 1 | 2 | 2 | 3 |
| 2 | 1 | 1 | 2 | 2 | 3 | 4 |
| 3 | 1 | 1 | 2 | 2 | 3 | 5 |
| 4 | 1 | 1 | 2 | 3 | 4 | 5 |
| 5 | 1 | 2 | 2 | 3 | 4 | 6 |
| 6 | 1 | 2 | 2 | 3 | 4 | 7 |
| 7 | 1 | 2 | 3 | 4 | 5 | 8 |
| 8 | 1 | 2 | 3 | 4 | 5 | 8 |
| 9 | 1 | 2 | 3 | 4 | 6 | 9 |
| 10 | 1 | 2 | 3 | 4 | 6 | 9 |
| 11 | 1 | 2 | 3 | 5 | 6 | 10 |
| 12 | 1 | 2 | 4 | 5 | 7 | 10 |
| ... | | | | | | |
| 63 | 3 | 5 | 10 | 14 | 21 | 35 |

Figure 4

| FEC packets | FEC level |
|---|---|
| F0 | 0 |
| F1 | 1 |
| F2 | 2 |
| F3 | 3 |
| F4 | 4 |
| F5 | 4 |
| F6 | 5 |
| F7 | 5 |
| F8 | 5 |

Figure 6

ERROR RESILIENCE FOR INTERACTIVE REAL-TIME MULTIMEDIA APPLICATION

PRIORITY

This patent application is a continuation patent application of a co-pending U.S. patent application having a U.S. patent application Ser. No. 15/157,182, filed on May 17, 2016 in the name of the same inventor and entitled "Error Resilience for Interactive Real-Time Multimedia Applications," which has been issued into the U.S. Pat. No. 9,813,193 which is a continuation patent application of a U.S. patent application having a U.S. patent application Ser. No. 14/462,266, filed on Aug. 18, 2014 and entitled "Error Resilience for Interactive Real-Time Multimedia Applications," which has been issue into the U.S. Pat. No. 9,344,218 which further claims the benefit of priority based upon United States Provisional Patent Application Ser. No. 61/867,558, filed on Aug. 19, 2013 in the name of the same inventor(s) and having a title of "Method and Apparatus for Providing Video Communication," all mentioned U.S. applications are hereby incorporated by references.

FIELD OF THE DISCLOSURE

The present disclosure generally relates to error resilience. The disclosure relates more specifically to error resilience for interactive multi-media applications such as video conferencing.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Real-time multimedia applications typically utilize user datagram protocol (UDP) as transport protocol due to stringent delay requirement. The receiving quality of such application is easy to suffer from packet loss due to the unreliable nature of UDP packet delivery. Packet loss on video stream will bring video mosaic or block which, thus highly impact user experience. Error resilience is an essential module in video conference system to achieve good end-to-end user experience in a non-promise internet environment.

Error resilience is to cause resilience to impact caused by packet loss on media stream. Common error resilience is usually composed with two parts: FEC and IDR request. Forward Error Correction (FEC) is to send an extra redundant stream besides the media stream. So lost media packet can be recovered by the receiver with no further reference to the sender. Common error resilience uses FEC redundant stream to recover lost data packet, and ask sender to encode an IDR picture to recover video sequence in case the lost packet cannot be recovered. In real-time video application, packet re-transmission is usually thought to be not suitable to handle packet lost on the network due to requirements of low delay.

SUMMARY

The appended claims may serve as a summary of the invention.

BRIEF DESCRIPTION OF THE DRAWINGS

In the drawings:

FIG. 3 illustrates a table according to an embodiment.

FIG. 4 illustrates a table according to an embodiment.

FIG. 6 illustrates a table according to an embodiment.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:

1. Overview
2. Forward Error Correction
3. Packet Re-transmission
4. Key Frame Request
5. Example Implementation Mechanism—Hardware Overview 1. Overview Multi-point video conferencing is utilized by many to have real-time audio and video images delivered among multiple users. The delivery of error-free data to multiple locations is important to support real-time video conferencing.

Real-time multimedia application such as peer-to-peer video chat or multi-point video conference consumes large bandwidth and is very sensitive to long delay and packet loss caused by network congestion.

In one embodiment, the use of error correction tools is utilized to improve performance of real-time multimedia applications such as video conferencing. And unlike common existing error resilience, in some conditions, packet re-transmission is also utilized as an effective way to resist packet lost.

Figure 1:
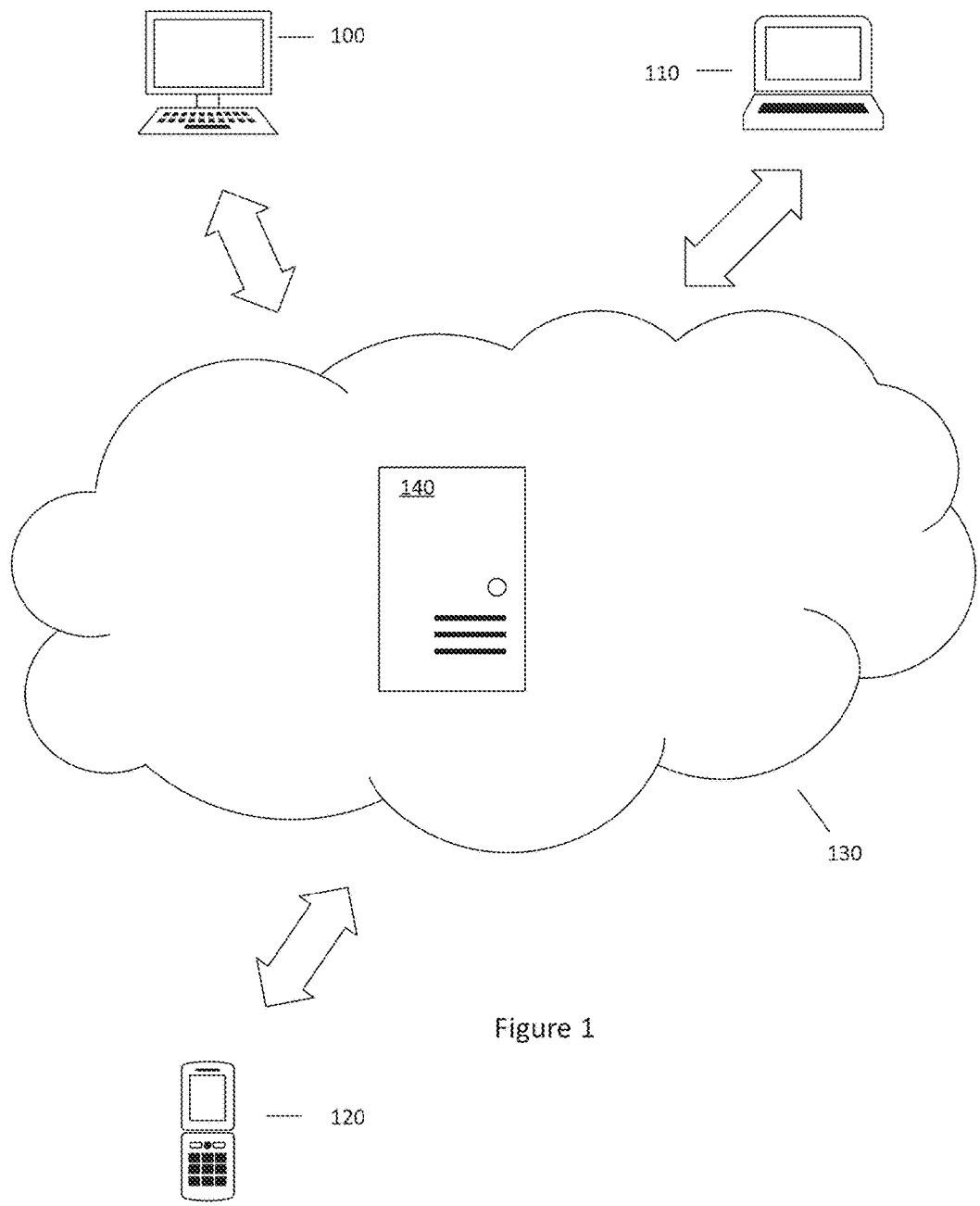
FIG. 1 illustrates a networked computer system with which an embodiment may be implemented.

FIG. 1 illustrates a networked computer system with which an embodiment may be implemented. In one approach, a server computer 140 is coupled to a network 130, which is also coupled to client computers 100, 110, 120. For purposes of illustrating a clear example, FIG. 1 shows a limited number of elements, but in practical embodiments there may be any number of certain elements shown in FIG. 1. For example, the server 140 may represent an instance among a large plurality of instances of the application server in a data center, cloud computing environment, or other mass computing environment. There also may include thousands or millions of client computers.

In an embodiment, the server computer 140 hosts a video conferencing meeting and transmits and receives video, image, and audio data to and from each of the client computers 100, 110, 120.

Each of the client computers 100, 110, 120 comprises a computing device having a central processing unit (CPU), graphics processing unit (GPU), one or more buses, memory organized as volatile and/or nonvolatile storage, one or more data input devices, I/O interfaces and output devices such as loudspeakers or a LINE-OUT jack and associated drivers. Each of the client computers 100, 110, 120 may include an integrated or separate display unit such as a computer screen, TV screen or other display. Client computers 100, 110, 120 may comprise any of mobile or stationary computers including desktop computers, laptops, netbooks, ultrabooks, tablet computers, smartphones, etc. Typically the GPU and CPU each manage separate hardware memory spaces. For example, CPU memory may be used primarily for storing program instructions and data associated with application programs, whereas GPU memory may have a high-speed bus connection to the GPU and may be directly mapped to row/column drivers or driver circuits associated with a liquid crystal display (LCD) that serves as the display. In one embodiment, the network 130 is the Internet.

Each of the client computers 100, 110, 120 hosts, in an embodiment, an application that allows each of the client computers 100, 110, 120 to communicate with the server computer 140. In an embodiment, the server 140 may maintain a plurality of accounts, each associated with one of the client computers 100, 110, 120 and/or one or more users of the client computers.

2. Forward Error Correction

If a media stream is not protected with FEC, packet loss of a frame will cause decode error of that frame and impact video experience. We call a frame is broken if any of its data packet is lost. The possibility, or frequency, of broken frame has direct relation with packet loss ratio. The possibility of broken frame increases with increase of packet loss ratio.

The impact degree is different when un-recover happens on different frames. A scalable video stream is composed with several layers with different importance level, usually one base layer and one or more enhancement layers. Packet loss of base layer will cause the base frame to be decoded incorrectly. As other frames will directly or in-directly refer to the base frame, so loss of the base frame will cause continual mosaic or video block, until the arrival of IDR frame or the base frame which only refer to the base frame earlier than the first corrupted base frame. Packet loss of an enhancement frame (layer N) only impacts decoding of following equal or higher enhancement frame, and the issue will be ended with the arrival of next layer with higher layer (<N). So base layer is the most important, enhancement layer 1 is more important than layer 2, and so on.

FEC is used to decrease possibility (or frequency) of broken frame thus make impact of broken frame under acceptable via transmitting redundant packets besides media packets. There are also some properties about FEC. FEC's recoverability is increased with the increase of redundancy. So higher FEC redundancy can decrease the probability of a broken frame, thus decrease broken frame rate. But a higher FEC redundancy means FEC redundant packets need to occupy more bandwidth thus decrease bit rate used on video media, thus decrease video quality.

Better protection should be given on more important layers, as broken data on an important frame has a more serious impact which is called Un-Equal Protection (UEP). The loss of a base layer will break decoding of following sequence, and the receiver has to send a key frame request to ask for a new sync point frame to recover the sequence. Loss of an enhancement layer will only affect decoding of current layer and following higher enhancement layer, and can be recovered automatically at the arrival of next lower layer, only decrease transitory frame rate of the video sequence. So base layer is the most important and should have with the strongest protection; the enhancement layer is less important and can have weaker protection.

To control the possibility of broken frame under a threshold, FEC redundancy should increase with the increase of network loss ratio. The target of FEC is not to completely prevent broken frame (the price is too high to completely avoid broken frame, or i), but to make possibility of broken frame under a threshold. When under the threshold, the impact caused by broken frame should be acceptable. We use Maximum Tolerant Broken Possibility (MTBP) to quantify importance level of a frame, and also use it to decide real-time FEC redundancy of different layer on real-time network. The value of MTBP is manually defined by user according to requirement of the application, and can be taken as a system parameter.

Figure 2:
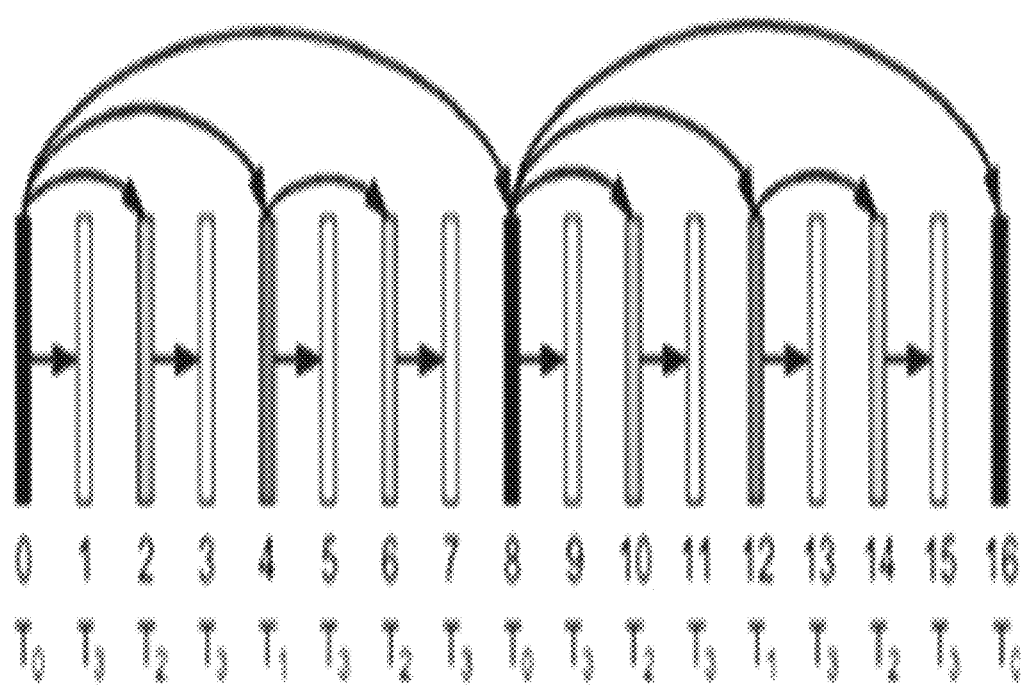
FIG. 2 illustrates a video encoding temporal structure according to an embodiment.

For example, FIG. 2 illustrates an exemplary MTBP diagram. In one embodiment, in multi-point video conference, a scalable video stream with three temporal layers T0, T1, T2. Overall frame rate is 30 fps, frame rate of T0 is 3.75 fps, T1 7.5 fps, T2 15 fps, network round-trip time 300 ms.

If a T0 frame is broken, a key frame request is sent, and waiting for the arrival of next IDR frame to recover the video sequence, the period will be long, so this will have a big impact on video quality; and also frequent IDR will decrease compression efficiency, thus impact all receivers. So the average interval between two broken T0 frames should be long enough, such as 60 ms. Then mean broken possibility of T0 should be 1/(30*7.5)=0.4%.

If a T2 frame is broken, it only affects this frame, and will recover at next frame, the block time is very small only ⅟₃₀=33 ms. So a broken T2 frame will not stop the video stream, only decrease frame rate. The FEC protection can mean unrecoverable possibility 50% is enough for T2. (50% means frame rate of T2 decreases from 15 fps to 7.5 fps, so overall frame rate from 30 fps to 22.5 fps).

T1 frame is more important than T2, but still will not need the key frame request, and can be recovered at next T0 frame. So a broken T2 frame will bring a 2 frame freeze (67 ms). Its FEC protection can be a little higher than T2, 10% is enough for T1. (10% means may bring 20% frame un-decodable, thus decrease frame rate from 30 fps to 24 fps)

With above FEC protection (T0: 0.1%, T1: 10%, T2: 50%), result of video quality over network is packet loss is expected to be: average frame rate, 24−12*0.5=18 fps, a small block 500 ms freeze each 30 ms.

In one embodiment, different FEC schemes are utilized with MTBP. Three parameters are included in FEC scheme (C, N, K)

C: FEC coding algorithm, it can be XOR, Reed-Solomon etc.

N: Number of Source packets which will be used to generate redundancy packets. Considering low-latency requirement, only RTP packets of the same frame (layer) are combined together for FEC coding. So N is RTP packets number of a frame.

K: Number of redundancy packets to be generated. K represents redundancy, and can be derived at given source packet num N, real-time network packet loss $\rho(t)$ and system defined parameter $\gamma$ MTBP.

$$K=\mathrm{minimum}(k | l(N,k,\rho(t)) \geq \gamma)$$

$\rho(t)$: Real-time packet loss model l(N, k, ρ(t)): mean unrecoverable possibility for a FEC group with N data packets, k FEC packets over network with packet loss ρ(t)

γ: Tolerant mean unrecoverable possibility.

For example as shown in Equation 1, if packet loss is independent uniform distribution ρ(t)=u, then the broken possibility l(N, K, ρ) is equal to the possibility sum of lose N+1, N+2, . . . . , N+K packets.

$$l(N, K, \rho) = \sum_{m=N+1}^{N+K} p(m) = \sum_{m=N+1}^{N+K} \binom{m}{N+K} u^m (1-u)^{N+K-m}$$ Equation 1

From Equation 1 above, it is computationally intensive to derive optimum K. It is also difficult to compute the K with FEC process of each frame. FIG. 3 illustrates a computation for Loss and Anchor Loss at different Loss Levels. The packet loss (Loss) is quantized into several Loss Levels.

FIG. 4 illustrates a K for a given (N, L) where the N is represented by the first column on the left hand side and L is represented by the top row.

Figure 5:
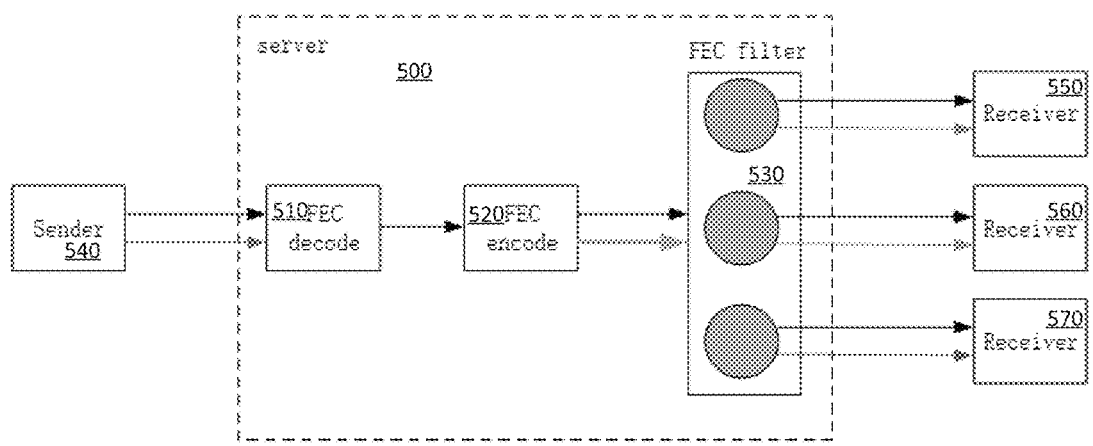
FIG. 5 illustrates a block diagram according to one embodiment.

In one embodiment, to provide better recover capability, FEC is implemented independently for the uplink and downlink. FIG. 5 illustrates an exemplary embodiment including a sever 500, FEC decode 510, FEC encode 520, FEC filter 530, sender 540, and receivers 550, 560, 570. In one embodiment, the server 500 functions similar to the server 140. The sender 540 acts as a client is configured to send data to the receivers 550, 560, 570. The receivers 550, 560, 570 also act as clients and are configured to receive data from the sender 540.

The sender 540 decides if FEC redundancy is only applied to recover packet loss of the uplink and/or downlink network. The server 500 first recovers lost data packet with FEC decode 510, and then re-encode FEC with the FEC encode 520 to cover downlink packet loss.

In video conference, the sender's video usually needs to be forwarded to several receivers, and the downlink packet loss of different receiver is different. The required FEC redundancy is also different. In one embodiment, the FEC encode 520 encodes for each receiver independently to adapt each downlink's loss condition. In another embodiment, the server 500 does not implement video composition and trans-coding, and only filters and forwards packets to receivers. In this case, the computation of FEC re-coding occupy a large percentage of CPU cost on the server 500. This will bring huge computation costs to do a FEC encode for each receiver, especially for conference with many attendees. In one embodiment, selectively FEC encode with redundancy to cover the specific receiver with the worst packet loss. Further a process after FEC encode is added through the FEC filter 530. The FEC filter 530 is configured to send FEC redundancy to adapt each receiver's network condition.

FIG. 6 illustrates an exemplary table that is utilized by the FEC filter 530.

For example, in a video conference, the video of the sender 540 is subscribed by the receivers 550, 560, 570. The packet loss level of receiver 550 is 5; the packet loss level of receiver 560 is 1; the packet loss level of receiver 570 is 3. Then server FEC encode 530 generates FEC packets to cover packet loss level 5 and above. Then, if a frame has 10 packets, per FIG. 6, there needs to be generated a total 9 FEC packets (denotes as F0, F1, . . . , F8).

Needs only 1 FEC packet to cover if packet loss level is 0, denotes F0 with FEC level 0; needs 2 FEC packets to cover loss level 1, denotes F1 with FEC level 1; needs 3 packets to cover loss level 2, denotes F2 with FEC level 2; needs 4 packets to cover loss level 3, denotes F3 with FEC level 3; needs 6 packets to cover loss level 4, denotes F4, F5 with FEC level 4; and needs 9 packets to cover loss level 5, denotes F6, F7, F8 with FEC level 5;

FEC filter 530 implements a forward or no-forward decision for each input FEC packet, its parameter is a real-time packet loss level of corresponding receivers 550, 560, 570. The FEC filter 530 forwards FEC packets with level equal or lower than its loss level to each receiver and will not forward FEC packets with level larger than its loss level. Receiver 570's packet loss level is 3, and then FEC filter 530 will forward F0, F1, F2, F3 to D.

3. Packet Re-Transmission

Packet re-transmission will increase end-to-end delay thus impact communication experience. For a network with round trip delay (rtt) r, it takes 0.5*r to confirm one packet is lost and decide to ask for re-transmission, and takes 1.5*r to wait for the re-transmit packet. For example, it takes 1*r for to send re-transmission request and receive the re-transmit packet, considering network delay variation and 1.5*r is a reasonable to wait for the re-transmitted packet. So the delay expense of one time re-transmission is about 2*rtt. And sometimes, the re-transmitted packet will also be dropped on network, so extra delay is actually out of control if need to assure arrival of every packets. it might have to re-transmit one un-luck packet for many times.

Bandwidth cost by re-transmitted packets is much less than bandwidth cost by FEC redundant packets especially for low bit rate stream. FEC protection efficiency is much lower in low bit rate case (when N is small). FEC efficiency is not ideal in low bandwidth/bit rate case. For example, to resilient 15% packet loss, if N=1, it needs 2 FEC packets, means 300% redundancy; if N=10, it needs 5 FEC packets, means 50% redundancy. For example, in a network with average packet loss ratio 15%, bit rate of media stream is b. If use re-transmission method, theoretical bit rate of re-transmit packets is $\Sigma_{n=1}^{\infty} 0.15^n * b \approx 0.18 * b$. If protect with FEC, the bit rate of FEC is about 0.5*b to 2.0*b.

End-to-end delay is critical for real-time video conference. Maximum extra delay introduced by re-transmission should be acceptable and under control. This can be achieved via limiting maximum re-transmission times. For example, in a network with rtt 50 ms, if a limit maximum re-transmission times is set at 1, then maximum extra delay caused by re-transmission is 2*rtt=2*50 ms=100 ms. The challenge is to provide enough error recover capability at given maximum re-transmission times, usually only 1 or 2, for real-time video.

To increase error recover capability in one embodiment, retransmission and FEC are utilized together. For example, re-transmit multiple same packets in some re-transmit. For example, re-transmit at most two times, re-transmit 1 packet in the first re-transmission, and re-transmit two duplicated packets in the last re-transmission. If the network packet loss is 20%, then the final packet loss after re-transmission is about 0.16% (0.2^4, have at most 4 chances). Used together with FEC, basic level error recover capability is achieved. For example, if the goal is good error resilient capability for packet loss ratio within 3%, then the final packet lost ratio needs to be within 3% after re-transmission. For a network with average loss ratio 30%, it can be achieved via use 1 time re-transmission, and transmit 2 duplicated packets in the re-transmission (30%^3=2.7%). If FEC is not used, more re-transmission times are needed to make the final loss ratio is small enough as there is no FEC to provide further lost recover.

Figure 7:
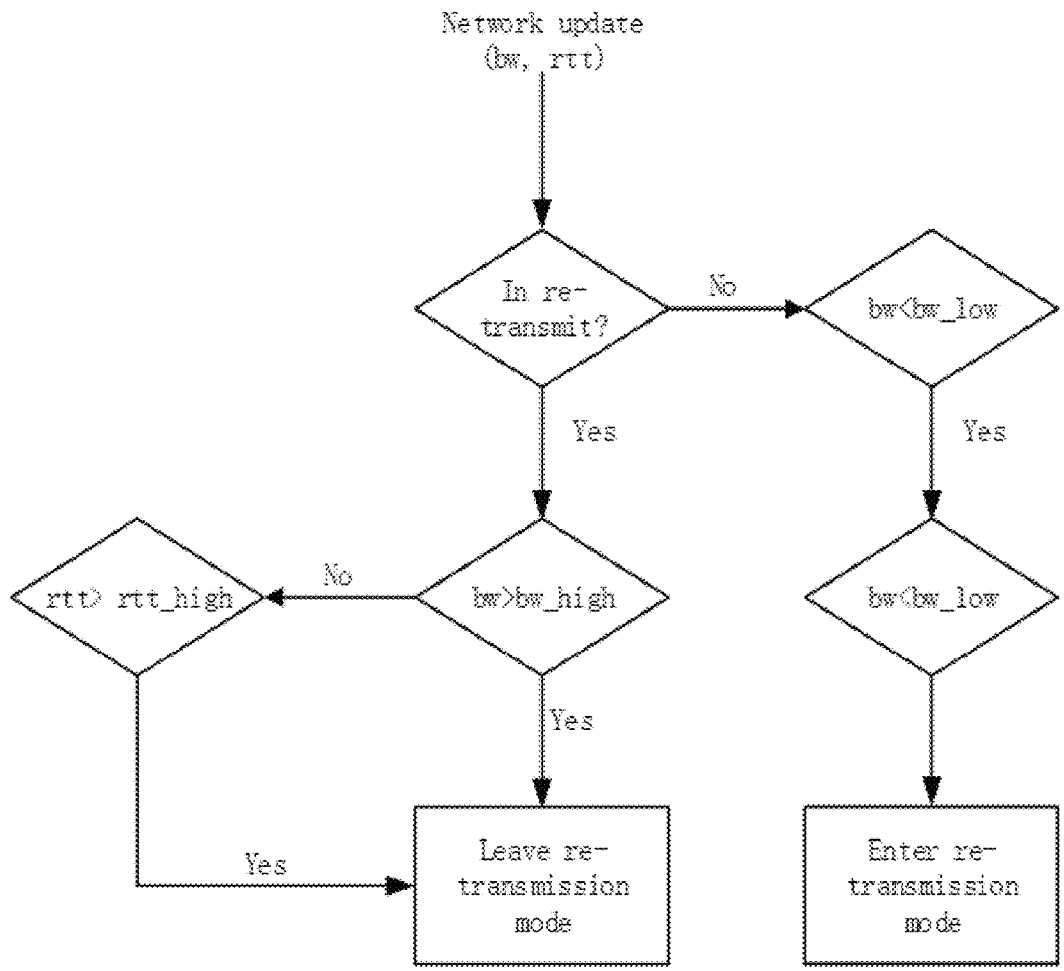
FIG. 7 illustrates a flow diagram according to an embodiment.

FIG. 7 illustrates different use cases for re-transmission. One use case is when the total available bandwidth is low and network round trip delay is small. When available bandwidth is low, the effective bit rate used for media stream has larger effect on the video quality, so re-transmission is valuable in such condition. And to assure extra end-to-end delay has no obvious impact on communication experience, we only enter re-transmission mode when network latency is small. As available bandwidth and latency may dynamic change with time, so it may dynamic enter or leave re-transmission mode.

In another use case when is for a non-active speaker's video. In this use case, in a video conference with multiple attendees, a client is usually receiving several attendees' video at the same time. Usually one large video to display video of active speaker and several thumbnail small videos from other attendees. In video conference, people are usually focused on video of active speaker, and not sensitive to other attendee's small video. We can use re-transmission other than FEC for those thumbnail video, so we can allocate more bandwidth on active speaker's video to get higher quality.

4. Key Frame Request

Even with FEC and re-transmission, there is still possibility that packets may not be received at the receivers 550, 560, 570. If the lost packet is a base frame, the subsequent following video sequence will be interrupted. A key frame request is sent to the sender 540 to ask for a new sync-point. When the sender 540 receives the request, it will take action to encode a sync-point frame to recover the broken sequence.

In one embodiment, a P frame is utilized instead of IDR frame as sync-point frame for key frame request. A key frame request is also called IDR request, as the sender will encode an IDR frame when received the request. Although encoding an IDR frame is simple and direct, it is not the ideal method because the compression efficiency of IDR frame is much lower. In one embodiment, encode a base frame as re-sync frame. This re-sync frame is a base frame which only uses correctly received base frames as reference frames, so receiver will be able to decode the sync frame correctly. To support it, the receiver needs to tell sender Id of the last correctly decoded frame, and tell video encoder at the sender.

Figure 8:
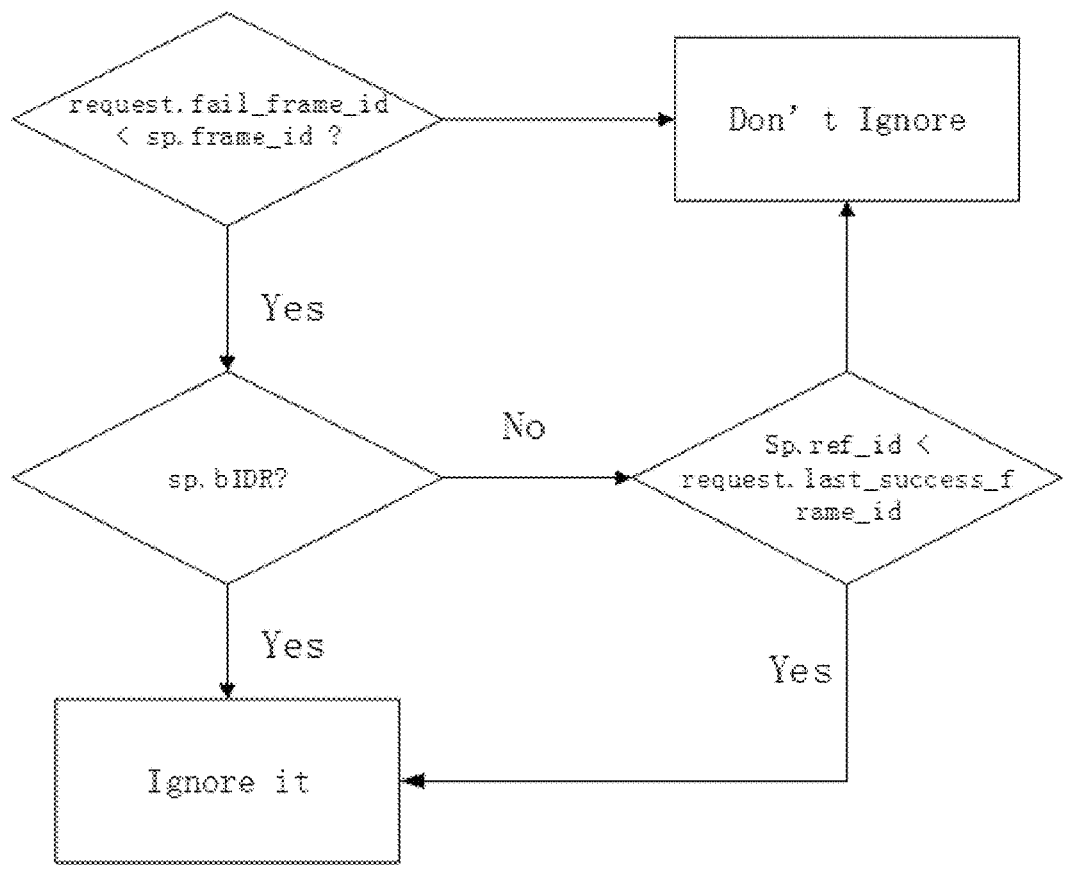
FIG. 8 illustrates a flow diagram according to an embodiment

In another embodiment, some key frame requests are selectively skipped. FIG. 8 illustrates various conditions in which key frame requests are skipped or ignored. Unlike peer-to-peer video, where a video source only has one receiver, video sender in a video conference may have several receivers at the same time. The key frame request of a receiver is first sent to server and then server forward it to sender. As different receivers may encounter decode error at the same time, and send key frame request in similar time. In many conditions, it only needs to handle one or a few key frame request of those many key frame requests from different receivers. For example, one's video are subscribed by 20 receivers, if there is a packet loss that happens on an uplink network (network from sender to server), then all the 20 receivers will suffer the packet loss and will send a key frame request on it. All these key frame requests will all be forwarded to sender and will cause a burden for the command connection if there are not 20 but 200 or even 2000 receivers in the conference. Further, if the sender encodes sync frame for all those requests, there will be many sync frames in short time, this will highly increase stream rate.

In one embodiment, both server and sender will record information of latest sync frame, if the latest sync frame on the way can recover the broken video sequence, then the request will be ignored. For example, if this happens at the server, the server won't forward the request to sender. If at this happens at the sender, encoder won't encode a new sync frame for that request.

Exemplary information below can be included in the message of a key frame request.

| id of current failed frame | Id of last corrected frame |
|---|---|

Information of a sync point includes:

| bIDR | Frame id | Id of reference base frame |
|---|---|---|

5. Example Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
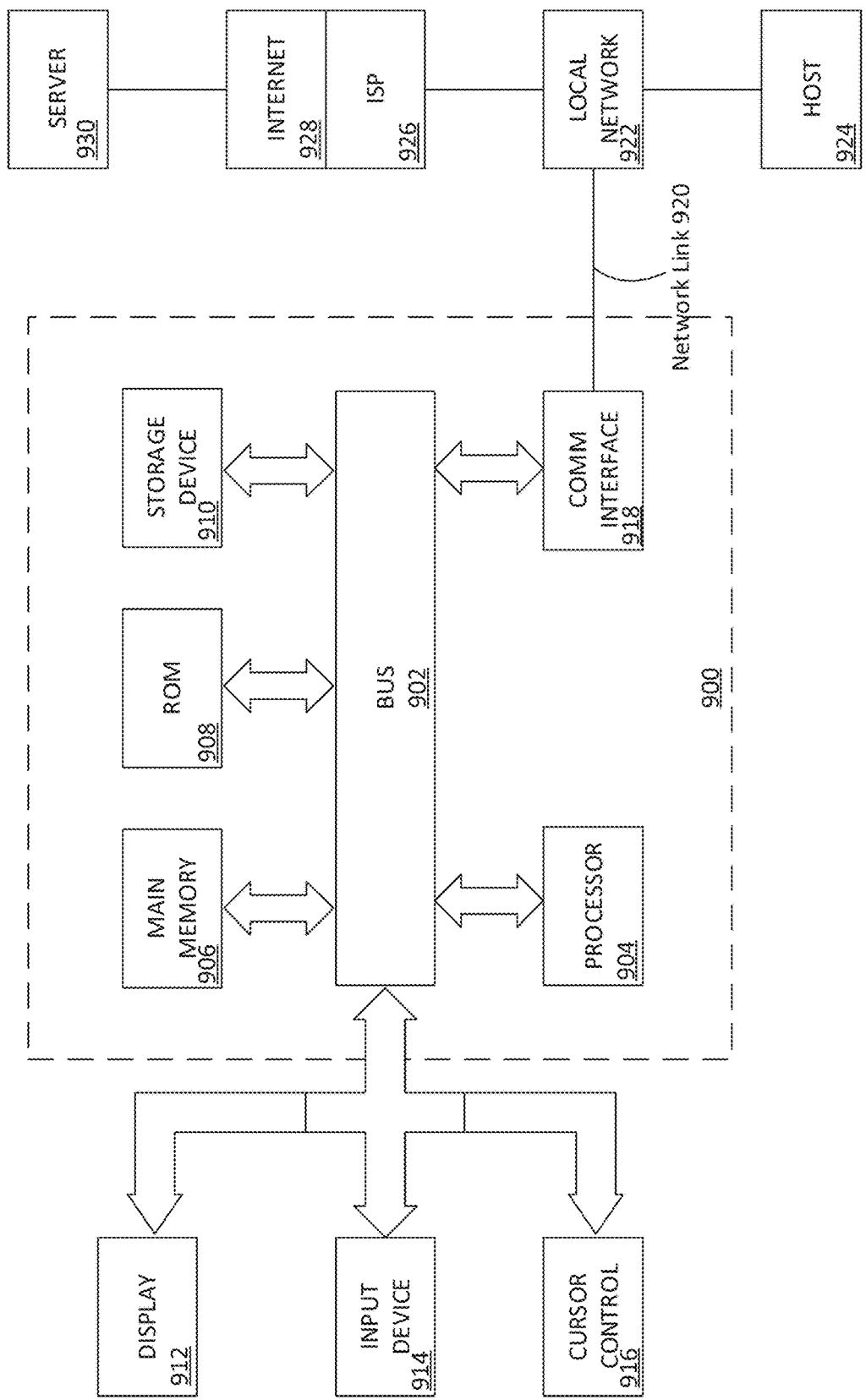
FIG. 9 illustrates a computer system with which an embodiment may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 1002. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 1004 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An error resilience method comprising:
   using a computer, creating and storing, in computer memory, a FEC filter table for use by a FEC filter for selectively forwarding a FEC packet;
   requesting the FEC packet through the FEC filter based on the FEC table and a dynamic packet loss level at a receiver; and
   selectively skipping a key frame request based on a number of key frame requests received from at least one of a plurality receiver devices,
   wherein the method is performed by one or more special-purpose computing devices.

2. The method of claim 1, further comprising selectively applying FEC to an uplink network and a downlink network.

3. The method of claim 2, further comprising applying FEC decode and encode to the downlink network.

4. The method of claim 1, wherein skipping the key frame request occurs when more than 5 key frame requests are received.

5. The method of claim1, wherein skipping the key frame request occurs a loss occurs on an uplink network from a sender to the server.

6. The method of claim 1, further comprising requesting a P frame on a base frame.

7. The method of claim 1, further comprising limiting a re-transmission request for a particular packet through the FEC filter based on a number of re-transmission requests for the particular packet.

8. A system comprising:
non-transitory computer-readable data storage media with one or more sequences of instructions that are arranged, when executed using a computer, to cause the computer to perform:
creating and storing, in computer memory, a FEC filter table for use by a FEC filter for selectively forwarding a FEC packet;
requesting the FEC packet through the FEC filter based on the FEC table and a dynamic packet loss level at a receiver; and
selectively skipping a key frame request based on a number of key frame requests received from at least one of a plurality receiver devices.

9. The system of claim 8, further causing the computer to perform:
selectively applying FEC to an uplink network and a downlink network.

10. The system of claim 9, further causing the computer to perform: applying FEC decode and encode to the downlink network.

11. The system of claim 8, wherein skipping the key frame request occurs when more than 5 key frame requests are received.

12. The system of claim 8, wherein skipping the key frame request occurs a loss occurs on an uplink network from a sender to the server.

13. The system of claim 8, further causing the computer to perform: requesting a P frame on a base frame.

14. The system of claim 8, further causing the computer to perform: limiting a re-transmission request for a particular packet through the FEC filter based on a number of re-transmission requests for the particular packet.

* * * * *